United States Patent
Gil et al.

(10) Patent No.: US 9,407,013 B2
(45) Date of Patent: Aug. 2, 2016

(54) MIMO ANTENNA DESIGN USED IN FADING ENVIRONMENTS

(71) Applicant: XG TECHNOLOGY, INC., Sarasota, FL (US)

(72) Inventors: Jorge L. Gil, Tamarac, FL (US); Nadeem Khan, Sunrise, FL (US)

(73) Assignee: XG TECHNOLOGY, INC., Sarasota, FL (US)

( * ) Notice: Subject to any disclaimer, the term of this patent is extended or adjusted under 35 U.S.C. 154(b) by 219 days.

(21) Appl. No.: 13/865,356

(22) Filed: Apr. 18, 2013

(65) Prior Publication Data

US 2014/0139398 A1    May 22, 2014

Related U.S. Application Data

(60) Provisional application No. 61/635,528, filed on Apr. 19, 2012.

(51) Int. Cl.
| | | |
|---|---|---|
| *H01Q 21/00* | (2006.01) |
| *H01Q 21/28* | (2006.01) |
| *H01Q 21/06* | (2006.01) |
| *H01Q 21/20* | (2006.01) |
| *H04B 7/04* | (2006.01) |

(52) U.S. Cl.
CPC ............. *H01Q 21/28* (2013.01); *H01Q 21/064* (2013.01); *H01Q 21/20* (2013.01); *H04B 7/0413* (2013.01)

(58) Field of Classification Search
CPC ..... H01Q 21/28; H01Q 21/064; H01Q 21/20; H04B 7/0413
USPC .................. 343/893, 767, 769, 770
See application file for complete search history.

(56) References Cited

U.S. PATENT DOCUMENTS

| | | | |
|---|---|---|---|
| 2010/0073239 A1* | 3/2010 | Tatarnikov et al. | .... 343/700 MS |
| 2010/0231476 A1* | 9/2010 | Chiang et al. | ................. 343/780 |
| 2014/0097990 A1* | 4/2014 | Aboush | .................. 343/700 MS |

* cited by examiner

*Primary Examiner* — Sue A Purvis
*Assistant Examiner* — Jae Kim
(74) *Attorney, Agent, or Firm* — Dennis L. Cook, Esq.

(57) ABSTRACT

A MIMO antenna used in both transmit and receive operations, with the ability to serve an n-by-n MIMO transceiver architecture (where n can take integer values between 0 to 4). The structure is designed to increase the effective area of the array by coupling the bars of the antenna to the disc and results in good isolation and low envelope correlation.

1 Claim, 2 Drawing Sheets

MIMO ANTENNA DESIGN USED IN FADING ENVIRONMENTS

CROSS-REFERENCE TO RELATED APPLICATION

The present application claims the benefit of previously filed co-pending Provisional Patent Application, Ser. No. 61/635,528 filed Apr. 19, 2012.

FIELD OF THE INVENTION

This invention describes a Multiple Input Multiple Output (MIMO) antenna design and more specifically relates to a MIMO antenna design for mobile devices operating in the ISM 900 MHz band that need to operate in a fading environment.

BACKGROUND OF THE INVENTION

The ISM 900 MHz band ranges from 902 MHz to 928 MHz. Products offered in this band by numerous manufacturers include simple applications like a baby monitor or a garage door opener to more sophisticated products like a nationwide mobile VOIP solution. For devices using a time division duplex scheme, there is a critical need to receive and transmit data slots in an uninterrupted fashion. A MIMO transceiver can increase the probability of useful Signal to Noise Ratio (SINR) using Maximum Ratio Combining (MRC) and other combining methods. To achieve the abovementioned transmissions the MIMO transceiver needs non-correlated channels at each of its receivers. The MIMO antenna array proposed produces 4 by 4 uncorrelated paths thru use of spatial diversity.

An antenna is a critical part of any wireless transceiver device. There are any number of different types of antennae each tuned for specific frequency bands and applications. Antenna parameters such as radiation pattern, bandwidth, gain, physical size, and realization techniques are dependent on specific applications. Mobile communication devices sometimes use multiband antennae (all integrated into one single antenna) that cover a variety of frequency bands. Gain, cost, and size of the antenna are important factors when designing antennae for mobile transceiver devices. Realization techniques for such antennae have varied over the years from simple wire type (fixed or telescopic) to more sophisticated chip antennae or printed circuit antennae with various assembly techniques ranging from simple printed circuit board mounted antennae to more complicated flip mechanical assemblies.

With more MIMO transceiver designs and OFDM transmissions to combat fading being used in wireless communications, a typical simple antenna arrangement will not meet the above mentioned requirements and a new MIMO antenna design is needed.

BRIEF SUMMARY OF THE INVENTION

The invention described in this application has the advantage of operating as an array antenna in the 900 ISM band. The structure facilitates four orthogonal currents. Easy manufacturing using an etching process to construct both the antenna and ground structure is also used. The antenna is used in both transmit and receive operations, with the ability to serve an n-by-n MIMO transceiver architecture (where n can take integer values between 0 to 4). The structure is designed to increase the effective area of the array by coupling the bars of the antenna to the disc, which results in good isolation and low envelope correlation.

Therefore, it is an object of this invention to provide an antenna that will provide the needed diversity gain and envelope correlation for MIMO transceivers.

It is further object of this invention to provide an antenna that is tuned for the ISM 900 MHz band.

It is further object of this invention to provide an easily mass produced antenna array.

It is further object of this invention to provide an antenna that can operate in close proximity to batteries, shield cans and the human chest or leg.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

The MIMO antenna described in this application has the advantage of operating as an array antenna in the 900 ISM band. The preferred embodiment structure facilitates four orthogonal currents and is completely housed in a 5 inch by 3 inch by 0.1 inch think patch. Easy manufacturing is accomplished by using an etching process to construct both the antenna and ground structure on a Taconic Cer-10 for the preferred embodiment. The MIMO antenna is used in both transmit and receive operations, with the ability to serve an n-by-n MIMO transceiver architecture (where n can take integer values between 0 to 4). The MIMO antenna structure is designed to increase the effective area of the array by coupling the bars of the antenna to the disc while still insuring good isolation and low envelope correlation.

The MIMO antenna of the preferred embodiment is designed to generate 4 orthogonal modes with optimum isolation between ports and good envelope correlation. The antenna uses a ring structure in a nonconventional way by coupling the bars of the antenna to the disc to increase isolation and effective area. A diagram of the present invention in a preferred embodiment of 4-by-4 is shown in FIGS. 1 and 2.

Figure 1:
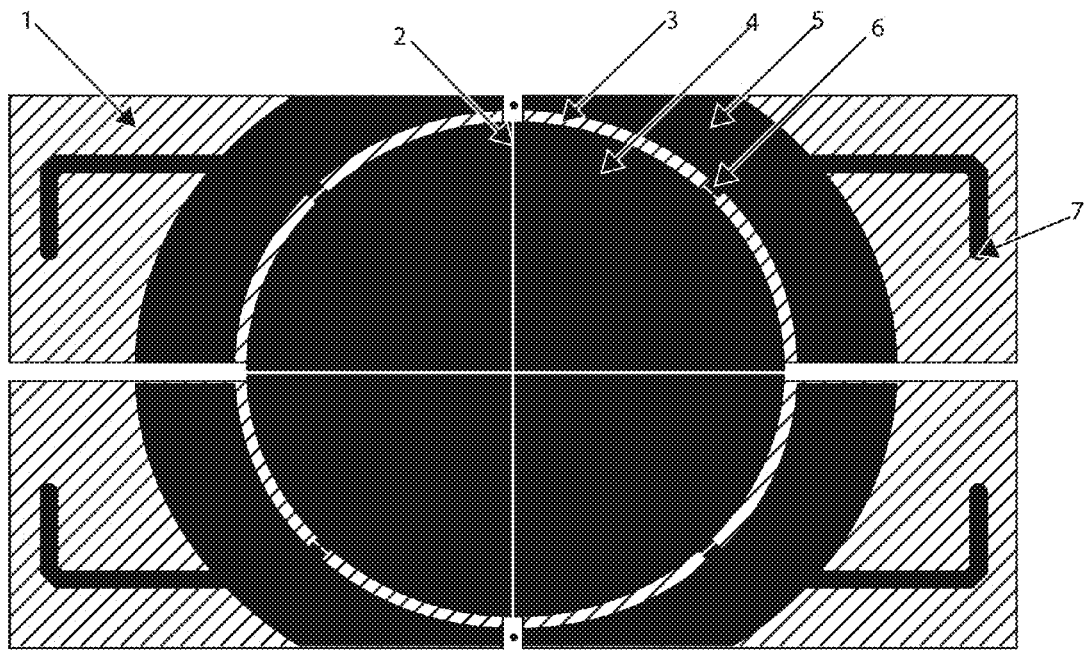
FIG. 1 is a diagram showing the top of the MIMO antenna design.

In FIG. 1 the black areas are top metal and the slanted line areas are bottom metal or grounds. This view is from the topside of the antenna.

Figure 2:
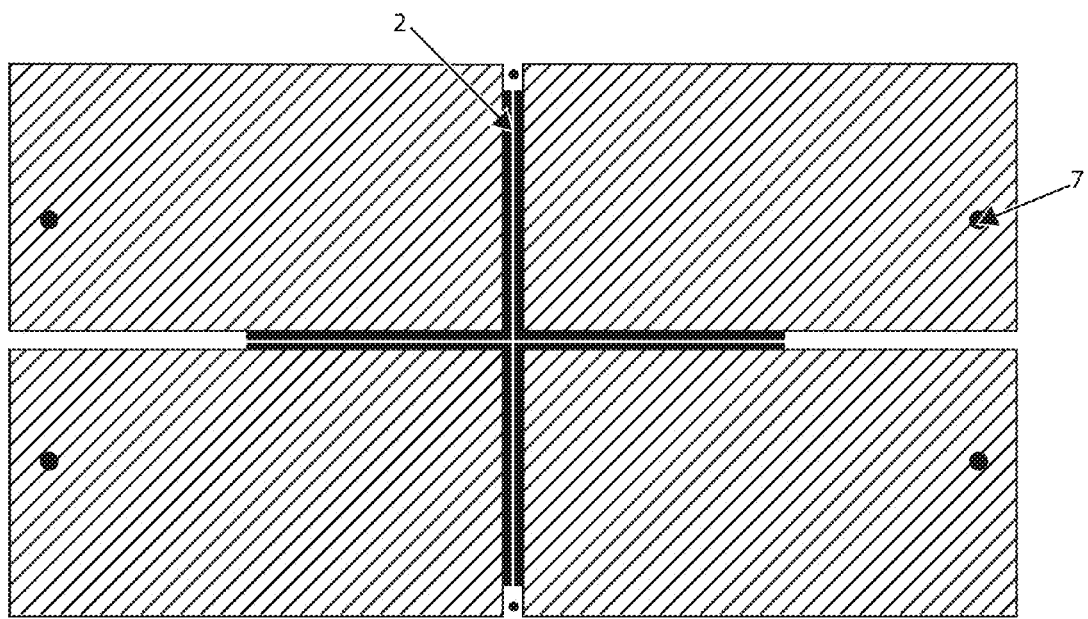
FIG. 2 is a diagram showing the bottom of the MIMO antenna design.

In FIG. 2 the view is from the bottom of the antenna and the slanted line areas are the isolated grounds and the black areas are the top metal.

The preferred embodiment MIMO antenna design shown in these figures has an improved 4-by-4 MIMO transceiver architecture resulting in increased isolation and effective area and is comprised of a flat circular antenna disc (1) defined by an outer diameter where the flat circular antenna disc has radial cuts (2) creating 4 equal pie shaped sections and the flat circular antenna disc (1) is further cut by a circular cut (2)

having a circular cut diameter less than the antenna disc (1) outer diameter, which then creates 4 equal pie shaped sections (4) ending at the circular cut (3) diameter and also 4 corresponding equal arc shaped sections (5) extending between the circular cut diameter (3) and the outer diameter of the antenna disc (1). Each of the 4 arc shaped sections (5) are connected to a different transceiver through connection areas (7) and, each of the 4 arc shaped sections (4) are coupled through the circular cut (3) to each of said corresponding 4 equal pie shaped sections (4) by a coupling via (6).

Figure 3:
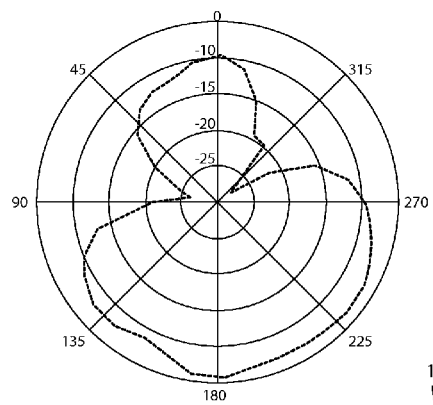
FIG. 3 shows radiation patterns of the four orthogonal lobes from each of the 4 sections of the MIMO antenna design.
Figure 3:
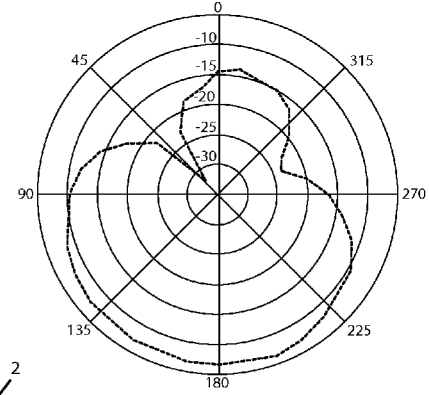
Figure 3:
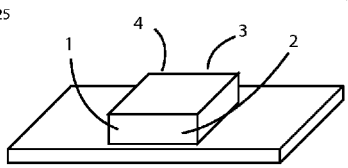
Figure 3:
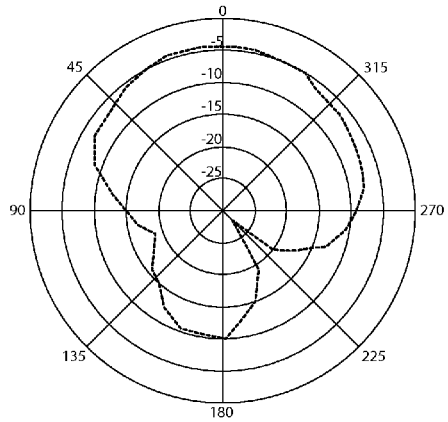
Figure 3:
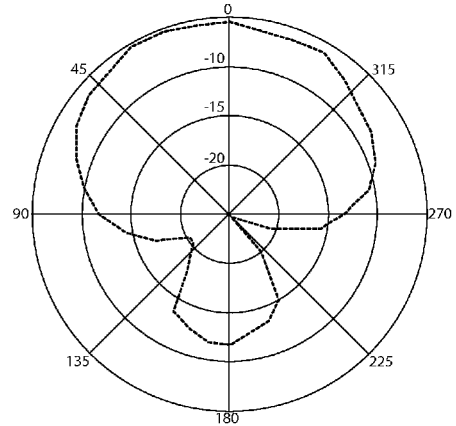

Simulation testing of the preferred embodiment of the MIMO antenna design revealed the tuning, isolation, and envelope correlation achieved with the new design. The worst-case isolation was approximately −9 dB and a 13 to 15 dB diversity gain was accomplished when using maximum ratio combining. The envelope correlation between all combinations of antennae in the array resulted in an envelope correlation that stays below 0.5. Radiation pattern data of FIG. 3 is showing the gains while the MIMO antenna is place in the free space zone on a table in the anechoic chamber. Also shown are the positions of each of the ports at zero degrees. Note that at zero degrees port 3 and 4 are at the back of the device.

Since certain changes may be made in the above described MIMO antenna design without departing from the scope of the invention herein involved, it is intended that all matter contained in the description thereof or shown in the accompanying figures shall be interpreted as illustrative and not in a limiting sense.

What is claimed is:

1. A Multiple Input Multiple Output (MIMO) antenna having an n-by-n MIMO transceiver architecture where n can take integer values of 2 or 4 resulting in increased isolation and effective area comprising: a flat antenna having an outer edge; said flat antenna being cut into n equal sectors by radial cuts; said flat antenna further being cut by a circular cut within said outer edge and creating n equal sectors ending at said circular cut and corresponding n equal arc shaped sections extending between said circular cut and said outer edge; each of said n arc shaped sections connected to a different transceiver; and, each of said n arc shaped sections coupled through said circular cut to each of said corresponding n equal sectors by a capacitive coupling bar which improves isolation and low envelope correlation.

* * * * *